Aug. 30, 1932. E. AUBORT 1,873,952
METHOD AND APPARATUS FOR SUPPRESSING HARMONICS IN DIRECT CURRENT SYSTEMS
Filed March 3, 1926
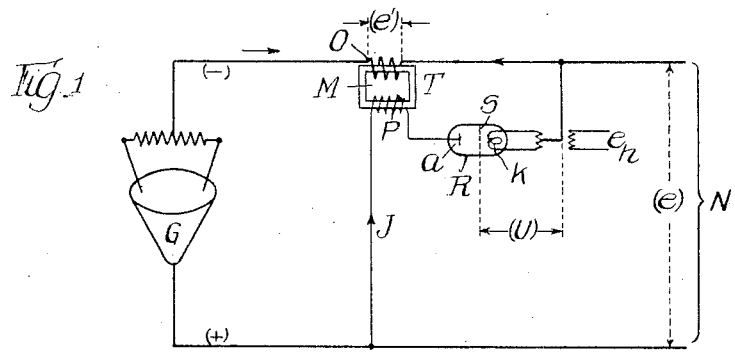
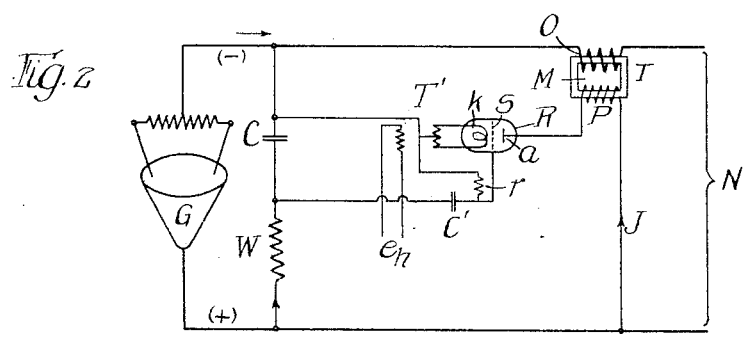
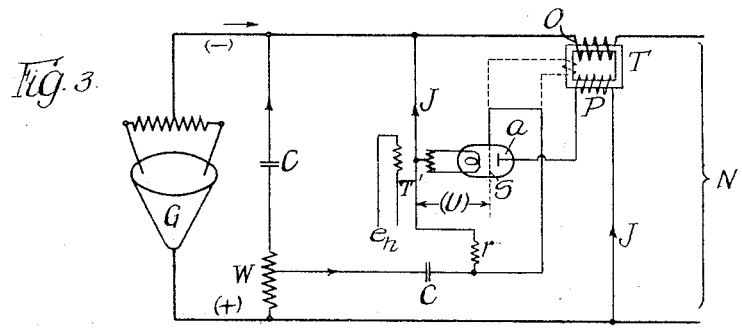
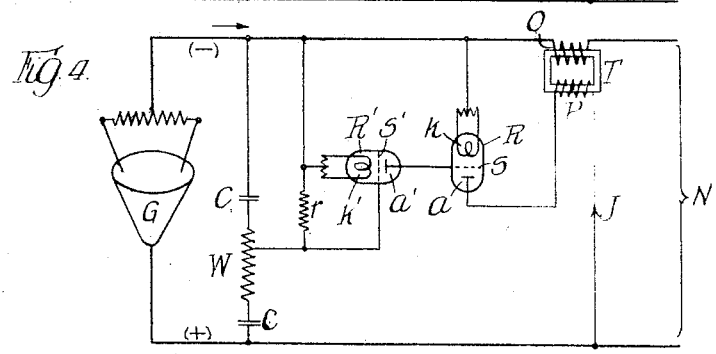
Inventor:
Edouard Aubort, Patented Aug. 30, 1932

1,873,952

UNITED STATES PATENT OFFICE

EDOUARD AUBORT, OF BADEN, SWITZERLAND, ASSIGNOR TO AKTIENGESELLSCHAFT BROWN BOVERI & CIE., OF BADEN, SWITZERLAND, A JOINT-STOCK COMPANY OF SWITZERLAND

METHOD AND APPARATUS FOR SUPPRESSING HARMONICS IN DIRECT CURRENT SYSTEMS

Application filed March 3, 1926, Serial No. 91,856, and in Germany March 5, 1925.

This invention has to do with method and apparatus for suppressing harmonic ripples or variations in electrical systems in which such effects are undesirable. It finds one application in connection with the use of rectifying apparatus for converting alternating current to direct, and is of particular utility in connection with mercury vapour rectifiers.

The general object is the suppression or elimination of such influences or current effects in a simple and reliable manner.

Another object is the accurate control of the harmonic counteracting influences.

A further object is the elimination of the necessity for large condensers etc., when the controlled circuit is operated at high voltages.

A still further object is the suppression of harmonics of complex wave form.

Other and further objects will be pointed out or indicated hereinafter, or be obvious to one skilled in the art upon an understanding of the invention.

In the drawing forming a part of this specification I show various arrangements of apparatus, same being presented for the purpose of illustrating the invention. These are not to be construed in any fashion having the effect of limiting the claims short of the true and most comprehensive scope of the invention in the art.

In the drawing,

Fig. 1 is a diagram of apparatus illustrating the invention,

Fig. 2 is a diagram illustrating one coupling of the control elements, and

Figs. 3 and 4 are diagrams illustrating other arrangements of the control elements.

In the rectification of alternating current through mercury vapour rectifiers there usually occurs, at the terminals, a voltage undulation which results in harmonic current effects in the systems or net works supplied with the rectified current. These effects may be disturbing to associated apparatus, such as telephone systems. One expedient used for the limiting of these effects is the connection of a choke coil in the output lines. Such an arrangement does not completely eliminate the disturbing factors, however, as in order to be effective at all, some of the harmonic current has to pass. One of the procedures contemplated by the present invention for the suppression of the harmonic influences is the impressing on the rectified current circuit of a compensating or counteracting voltage wave corresponding to that of the harmonic in frequency and form but opposing it in influence. As a means for deriving and controlling the compensating voltage I employ valves subject to the influences in the D. C. circuit. As illustrated in Fig. 1, let it be understood that G designates a mercury vapour rectifier supplying the net N, a reactance coil O being connected in the rectifier output line. An auxiliary coil P is arranged on the core with coil O so that it may induce in O an influence for neutralizing the harmonic, and is connected across the line through a three-electrode valve R, having the plate $a$ filament $k$ and grid S, the filament being supplied with heating current through a transformer from the source $e_n$. The shunt current through P, therefore, can be influenced in its strength by the grid S, dependent on the grid voltage $(u)$. By suitable selection of the grid voltage a frequency and amplitude can be impressed on core P such as to induce in O a voltage $(e')$ equal to the higher harmonic voltage $(e)$ in U but in opposite direction, so that the net will receive an almost pure direct current, free of the undesirable harmonic. As an example for determination of the grid voltage $(u)$, let $eg$ represent the direct current voltage of the net,
$e$ the rectifier harmonic voltage,
$e'$ the neutralizing voltage to oppose $e$,
$u$ the grid voltage J the current in the auxiliary coil circuit,
$L_1$ the coefficient of self induction of coil O
M the coefficient of mutual induction of the coils P and O
$k$ a constant, then, in the desired relations
$$e - e' = 0 \quad (1)$$
Since
$$-e' = (L_1 + M)\frac{dJ}{dt},$$
and in the used range of the control tube, neglecting the voltage drop in coil P,
$$J = ku, \text{ so}$$
$$-e' = (L_1 + M)k\frac{du}{dt} \quad (2)$$
From (1) and (2) results, as the equation for the control voltage $u$:
$$u = \frac{1}{(L_1+M)k}\int_0^t e\,dt$$
The grid voltage ($u$) must therefore, be proportional to $\int_0^t e\,dt$. To obtain this there may be arranged across the terminals an auxiliary circuit containing the ohmic resistance W and condenser C in series, wherein the capacity reactance $\frac{1}{C}$ is selected considerably smaller than the ohmic resistance W. This circuit therefore will carry an alternating current ($i$) having the same frequency as the harmonic in the net, and of which the magnitude and phase are determined mainly by resistance W. Therefore
$$i = \frac{e}{W} = g \times e,$$
whereby
$$g = \frac{i}{W}$$
Let Q represent the condenser charge and $e_c$ represent the voltage on the condenser, then
$$C \times e_c = Q = \int_0^t i\,dt = g\int_0^t e\,dt, \text{ or}$$
$$e_c = \frac{g}{C}\int_0^t e\,dt = k'\int_0^t e\,dt,$$
which gives the suitable grid voltage ($u$).

In Fig. 2 is shown an arrangement for impressing this voltage on the grid, same comprising the grid circuit connected to the auxiliary circuit across the condenser C and containing the small condenser C' to block the direct current, and the ohmic resistance $r$ for discharging the grid across the condensers.

In the foregoing derivation of the equations for the value of the grid voltage, a simplifying assumption has been made, as the voltage drop in coil P has been neglected. Due to this drop, the pressure acting on the valve is not equal to the voltage across the system. In case the circuit containing the valve is connected directly to the terminals of the rectifier, as shown in Fig. 2, the influence of the voltage drop in coil P will be partly compensated by the harmonic voltage, which is also impressed on the shunt circuits and is opposed to the drop in P by 180°. Should this compensation not be sufficient, the grid voltage may be increased by an addition which will give the necessary effectiveness in coil P. This addition, of course, must be proportional to the harmonic voltage and may be taken off at the resistance W. Then the voltage between the cathode and the grid may be determined from the equation
$$-u = k'\int_0^t e\,dt + k''e,$$
and the voltage drop in O compensated by a proper selection of values for the constants $k'$ and $k''$. Such an arrangement is shown in Fig. 3 wherein there exists at condenser C a voltage proportional to
$$\int_0^t e\,dt,$$
and at resistance W a voltage proportional to the rectifier terminal voltage $e$. With the cathode $k$ connected to the negative terminal of the rectifier and the grid S connected at a properly selected point in the resistance W on the positive side of the condenser C, then the proper components for the grid voltage will be obtained. In case the grid voltage necessary to operate the valve should be larger than the voltage at condenser C, or at that condenser and resistance W, a suitable amplifying arrangement may be made, one example of which is illustrated in Fig. 4. Here the voltage derived from the auxiliary circuit is used for controlling a special valve R', the plate circuit of which contains the grid S of the main valve R, thus forming a cascade connection whereby the control voltage on S is raised to the necessary value. The dotted portion in Fig. 3 illustrates an alternative arrangement for the back coupling of the grid current with that of the controlled circuit.

What I claim is:

1. The combination with a circuit tending to circulate a ripple current, of means for suppressing said ripple current comprising an electron valve having a control electrode, means for impressing on said control electrode a voltage corresponding to said ripple, said voltage having a value substantially smaller than that of the voltage across said circuit, and means for impressing the output of said electron valve on said circuit to inject therein a voltage counteracting said ripple.

2. The combination with a source of direct current having a super-posed ripple and a circuit leading from said source, of means for preventing the flow of a ripple current into said circuit comprising an electron valve having a control electrode, connections between said control electrode and said source to impress on said control electrode a voltage responsive to said ripple, said voltage having a value substantially smaller than that of the voltage across said circuit, and connections between the output of said valve and said circuit for impressing thereon a voltage opposing the flow of the ripple current in the said circuit.

3. The combination with a source of direct current having a ripple voltage and a circuit supplied from said source, of means for controlling the magnitude of ripples in said circuit comprising a three-electron valve having input and output electrodes, means for impressing on the input of said valve a voltage responsive to the voltage across said source and substantially smaller in value than said source voltage, and means for injecting the output of said valve in series with said circuit.

4. The combination with a source of direct current having a ripple voltage and a circuit supplied therefrom, of means for eliminating ripple current from said circuit comprising a transformer having primary and secondary winding connections, said primary winding connections being included in series with said circuit, said secondary winding connections being connected in shunt to said source, and an electron valve for controlling the flow of current in the circuit of said secondary winding connections in response to the ripple voltage, the value of the ripple voltage impressed on said valve being substantially less than the ripple voltage across the current source.

5. The combination with a source of direct current having a ripple voltage and a circuit supplied therefrom, of means for eliminating ripple current from said circuit comprising a transformer having primary and secondary winding connections, said primary winding connections being included in series with said circuit, said secondary winding connections being connected in shunt to said source, an electron valve for controlling the flow of current in the circuit of said secondary winding connections, said valve having an input circuit, and means for impressing on the input circuit a ripple voltage corresponding to the source ripple voltage and having a value substantially less than that of said source ripple voltage.

6. In a rectifier system comprising an output circuit, the current in which has a direct and an alternating component, and comprising a transformer element in series in said output circuit and a second transformer element in shunt therein, said second element being arranged in opposing relation to the series element to neutralize said alternating component, a three electrode vacuum tube arranged to control neutralizing alternating current across said output circuit through said second transformer element and to limit flow of the direct current component across said circuit, said tube being controlled by a voltage of the same frequency as the alternating voltage across said output circuit, the magnitude of the tube control voltage being substantially less than that of said output circuit alternating voltage.

7. In a rectifier system comprising an output circuit, the current in which has a direct and an alternating component, and comprising a transformer element in series in said output circuit and a second transformer element in shunt therein, said second element being arranged in opposing relation to the series element to neutralize said alternating component, a three electrode vacuum tube arranged to control neutralizing alternating current across the output circuit and through the second element and to limit flow of the direct current component across said circuit, an auxiliary circuit in shunt to said rectifier comprising a resistance in series with a capacity, the capacity reactance being substantially smaller than said resistance, and means to control the vacuum tube by the alternating voltage across said capacity.

8. In a rectifier system comprising an output circuit, the current in which has a direct and an alternating component, and comprising a transformer element in series in said output circuit and a second transformer element in shunt therein, said second element being arranged in opposing relation to the series element to neutralize said alternating component, a three electrode tube arranged to control neutralizing alternating current across the output circuit and through the second element and to limit flow of the direct current component across said circuit, an auxiliary circuit in shunt to said rectifier comprising a resistance in series with a capacity, the capacity reactance being substantially smaller than said resistance, and means to control the vacuum tube by the alternating voltage across said capacity and a portion of said resistance.

9. Apparatus for counteracting harmonics in the output of rectifiers, comprising an auxiliary circuit connected across the rectifier terminals, a transformer element energized by current from the auxiliary circuit, said transformer element arranged to affect the output circuit, and a valve for limiting flow of the direct component of the rectifier current across said terminals in said auxiliary circuit and for controlling the current in the auxiliary circuit, said valve having a control element influenced by the harmonic voltage.

10. Apparatus for counteracting harmonics in the output of rectifiers, comprising an auxiliary circuit energized from the rectifier output circuit, an impedance element energized from the auxiliary circuit, and a valve for limiting flow of the direct component of the rectifier current across said output circuit in said auxiliary circuit and for controlling energization of the impedance element, said valve having its action variable by the harmonic voltage.

11. Apparatus for counteracting harmonics in the output of rectifiers, comprising an impedance element effective on the output circuit, means for energizing said impedance element, and a valve for limiting flow of the direct component of the rectifier current across said output circuit and for controlling energization of said element, said valve having its action variable by the harmonic voltage.

12. Apparatus for counteracting harmonics in the output of rectifiers, comprising an impedance element effective on the output circuit an energizing circuit for said element, said energizing circuit including a three-electrode valve for limiting flow of the direct component of the rectifier current across said output circuit and for controlling energization of said element, and means for impressing the harmonic voltage on the control element of the valve.

13. Apparatus for counteracting harmonics in the output of rectifiers, comprising an impedance element effective on the output circuit, an energizing circuit for said element, said energizing circuit including a three-electrode valve for limiting flow of the direct component of the rectifier current across said output circuit and for controlling energization of said element, and means for impressing the harmonic on the valve.

14. Apparatus for counteracting harmonics in the output of rectifiers comprising a transformer operable to impress a counteracting voltage on the output circuit, and a three-electrode valve for limiting flow of the direct component of the rectifier current across said output circuit and for controlling the input to the transformer, said valve being subject to the harmonic variations.

15. Apparatus for counteracting harmonics in the output of rectifiers, comprising a transformer for impressing a counter-acting voltage on the output circuit, a circuit for energizing said transformer from the output circuit, said circuit including a three-electrode valve for limiting flow of the direct component of the rectifier current across said output circuit and for controlling energization of said transformer.

In testimony whereof I have hereunto subscribed my name at Zurich, Switzerland, on the 10th day of February, A. D. 1926.

EDOUARD AUBORT.